US011862094B2

(12) United States Patent
Lee et al.

(10) Patent No.: US 11,862,094 B2
(45) **Date of Patent: *Jan. 2, 2024**

(54) POWER MANAGEMENT DRIVER WITH POWER LINE FAULT DETECTION AND DISPLAY DEVICE HAVING THE SAME

(71) Applicant: SAMSUNG DISPLAY CO., LTD., Yongin-si (KR)

(72) Inventors: Dae Sik Lee, Yongin-si (KR); Si Duk Sung, Yongin-si (KR); Sang Hyun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,179

(22) Filed: Jun. 3, 2022

(65) Prior Publication Data

US 2022/0293058 A1 Sep. 15, 2022

Related U.S. Application Data

(63) Continuation of application No. 16/940,788, filed on Jul. 28, 2020, now Pat. No. 11,355,066.

(30) Foreign Application Priority Data

Dec. 31, 2019 (KR) ........................ 10-2019-0179066

(51) Int. Cl.
*G09G 3/3258* (2016.01)
*G09G 3/3233* (2016.01)
(Continued)

(52) U.S. Cl.
CPC ......... *G09G 3/3258* (2013.01); *G09G 3/3233* (2013.01); *G09G 3/3266* (2013.01);
(Continued)

(58) Field of Classification Search
CPC ... G09G 2300/0866; G09G 2310/0259; G09G 2310/0291; G09G 2310/08;
(Continued)

(56) References Cited

U.S. PATENT DOCUMENTS

| | | | |
|---|---|---|---|
| 9,058,773 | B2 | 6/2015 | Park |
| 10,297,200 | B2 | 5/2019 | Kim et al. |

(Continued)

FOREIGN PATENT DOCUMENTS

| | | |
|---|---|---|
| EP | 1935090 | 6/2008 |
| EP | 2980781 | 2/2016 |

(Continued)

OTHER PUBLICATIONS

Chun Hsiung Ng: "Switch-Level Modelling: Examples", Jan. 23, 1997 (Jan. 23, 1997), XP002802402, Retrieved from the Internet: UR: http: xilinx.pe.kr/_hdl/2/RESOURCES/www.ee.ed.ac.uk/~gerard// Teach/Verilog/me5cds/me95chn0.html [Retrieved on Mar. 16, 2021].

(Continued)

*Primary Examiner* — Chun-Nan Lin
(74) *Attorney, Agent, or Firm* — F. Chau & Associates, LLC

(57) ABSTRACT

A power management driver and a display device having the power management driver are provided, including a first power supply configured to supply a first voltage to a first driving power terminal of a pixel through a power line during a sensing period, and supply a second voltage to the first driving power terminal of the pixel through the power line during a display period; a controller configured to control timing at which the first voltage is output and timing at which the second voltage is output during a transition period between the display period and the sensing period in response to a sensing control signal; and a fault detector configured to detect a fault in the power line based on a (Continued)

current flowing through an output terminal during the sensing period.

20 Claims, 9 Drawing Sheets

(51) Int. Cl.
*G09G 3/3266* (2016.01)
*G09G 3/3275* (2016.01)

(52) U.S. Cl.
CPC ....... *G09G 3/3275* (2013.01); *G09G 2310/08* (2013.01); *G09G 2330/021* (2013.01); *G09G 2330/12* (2013.01)

(58) Field of Classification Search
CPC ..... G09G 2320/0295; G09G 2330/021; G09G 2330/028; G09G 2330/12; G09G 3/2092; G09G 3/3233; G09G 3/3258; G09G 3/3266; G09G 3/3275; G09G 1/00; G09G 3/00; G09G 5/00; G09G 2230/00; G09G 2290/00; G09G 2300/00; G09G 2310/00; G09G 2320/00; G09G 2330/00; G09G 2340/00; G09G 2350/00; G09G 2352/00; G09G 2354/00; G09G 2356/00; G09G 2358/00; G09G 2360/00; G09G 2370/00; G09G 2380/00
See application file for complete search history.

(56) References Cited

U.S. PATENT DOCUMENTS

| | | | | |
|---|---|---|---|---|
| 2012/0293562 | A1* | 11/2012 | Park | G09G 3/3233 345/212 |
| 2016/0063910 | A1 | 3/2016 | An | |
| 2017/0004773 | A1* | 1/2017 | Kim | G09G 3/3258 |
| 2018/0012543 | A1 | 1/2018 | Lee et al. | |
| 2019/0095033 | A1* | 3/2019 | Takeuchi | G06F 3/044 |
| 2019/0278114 | A1 | 9/2019 | Lee et al. | |
| 2020/0118485 | A1* | 4/2020 | Choi | G09G 3/3291 |
| 2021/0201792 | A1 | 7/2021 | Lee et al. | |

FOREIGN PATENT DOCUMENTS

| | | |
|---|---|---|
| KR | 10-2016-0027534 | 3/2016 |
| KR | 10-2017-0003871 | 1/2017 |
| KR | 10-1860739 | 5/2018 |

OTHER PUBLICATIONS

Office Action dated May 13, 2021 in corresponding U.S. Appl. No. 16/940,788.

* cited by examiner

POWER MANAGEMENT DRIVER WITH POWER LINE FAULT DETECTION AND DISPLAY DEVICE HAVING THE SAME

CROSS-REFERENCE TO RELATED APPLICATION

The present U.S. non-provisional patent application is a divisional continuation of co-pending U.S. patent application Ser. No. 16/940,788, titled POWER MANAGEMENT DRIVER AND DISPLAY DEVICE HAVING THE SAME, and filed on Jul. 28, 2020, which, in turn, claims priority under 35 U.S.C. § 119 to Korean patent application number 10-2019-0179066 filed on Dec. 31, 2019 in the Korean Intellectual Property Office (KIPO), the entire disclosure of which is incorporated by reference.

TECHNICAL FIELD

The present disclosure relates to a display device, and more particularly, to a display device having a power management driver.

DISCUSSION OF RELATED ART

A self-emissive display device displays an image using pixels coupled to a plurality of scan lines and data lines. For this operation, each of the pixels has a light-emitting element.

Such a light-emitting element is electrically coupled to a first driving power terminal supplying a first supply voltage VSS, and a second driving power terminal supplying a second supply voltage VDD, and emits light based on a current or voltage produced between the driving power terminals.

A power line or conductive pattern for transferring the supply voltages in the display device might contact other conductive lines due to unintended reasons such as cracks, foreign substances, or panel deformation, and cause a short-circuit fault. For any short-circuit fault in the power line, an overcurrent may occur and thus a risk of heat generation or fire may arise.

SUMMARY

Embodiments of the present disclosure are directed to a display device having a power management driver. According to at least one embodiment, a power management driver senses a voltage of a driving power terminal after the voltage of the driving power terminal has been stably supplied during a sensing period, and may thereby detect a short-circuit fault ("short") in the power line and protect a circuit. An exemplary embodiment of the present disclosure is directed to a display device having such a power management driver. Aspects of the present disclosure are not limited to the foregoing, and may be expanded in various forms without departing from the scope or spirit of the present disclosure.

An exemplary embodiment of the present disclosure may provide a power management driver. The power management driver may include a first power supply configured to supply a first voltage to a first driving power terminal of a pixel through a power line during a sensing period, and supply a second voltage to the first driving power terminal of the pixel through the power line during a display period, a controller configured to control timing at which the first voltage is output and timing at which the second voltage is output during a transition period between the display period and the sensing period in response to a sensing control signal, and a fault detector configured to detect a fault in the power line based on a current flowing through an output terminal during the sensing period.

In an exemplary embodiment, the first power supply may include a voltage determiner configured to determine the first voltage based on input power, a first switch coupled between the voltage determiner and the power line and configured to be turned on in response to a first enable signal, and a second switch coupled between the power line and a voltage source, to which the second voltage is supplied, and configured to be turned on in response to a second enable signal.

In an exemplary embodiment, the controller may include a first delay component configured to generate the first enable signal by delaying the sensing control signal, and supply the first enable signal to the first switch during the sensing period, and a second delay component configured to generate the second enable signal by inverting and delaying the sensing control signal, and supply the second enable signal to the second switch during the display period.

In an exemplary embodiment, when the sensing period progresses after the display period, the first switch may be turned on after the second switch has been turned off during a first transition period between the display period and the sensing period.

In an exemplary embodiment, when the display period progresses after the sensing period, the second switch may be turned on after the first switch has been turned off during a second transition period between the sensing period and the display period.

In an exemplary embodiment, the second voltage may be a ground voltage and the first voltage may be higher than the second voltage.

In an exemplary embodiment, the short detector may include a detected value extractor configured to extract at least one of a first detected value and a second detected value based on a positive current or a negative current flowing through the output terminal during the sensing period, and a protector configured to generate a protection signal based on the first detected value and the second detected value.

In an exemplary embodiment, the controller may limit output of the protection signal by the short detector during the transition period and a masking period including a preset initial period of the sensing period.

In an exemplary embodiment, the protector may include a first comparator configured to compare the first detected value with a first reference value and then generate a first result, a second comparator configured to compare the second detected value with a second reference value and then generate a second result, a logical OR operating component configured to generate the protection signal based on a result of a logical OR operation on the first result and the second result, and a switch configured to control output of the protection signal during the sensing period in response to a masking signal.

In an exemplary embodiment, the controller may provide the protector with a masking signal for turning off the switch during a masking period that is a preset initial period of the sensing period leading from the transition period.

In an exemplary embodiment, the controller may include a shutdown controller configured to count up a time during which the protection signal is output, and a counting controller configured to provide the shutdown controller with a reset signal for resetting a counted value based on a result of a comparison between a first glitch time for the first detected value and a preset noise ignorance time.

In an exemplary embodiment, when the counted value corresponds to a preset shutdown reference time, the shutdown controller may output the protection signal as a shutdown signal.

In an exemplary embodiment, when the first glitch time is longer than the noise ignorance time, the counting controller may generate the reset signal.

In an exemplary embodiment, the counting controller may generate the reset signal based on a result of a comparison between a second glitch time for the second detected value and the noise ignorance time.

In an embodiment, when the second glitch time is longer than the noise ignorance time, the counting controller may generate the reset signal.

In an exemplary embodiment, the power management driver may further include a second power supply configured to supply a voltage of a second driving power terminal to the pixel during the sensing period and the display period.

An exemplary embodiment of the present disclosure may provide a display device. The display device may include pixels coupled to scan lines, control lines, data lines, and sensing lines, a scan driver configured to supply a scan signal to the scan lines and supply a control signal to the control lines, a data driver configured to supply one of an image data signal and a sensing data signal to the data lines, a sensing circuit configured to sense characteristics of driving transistors included in the pixels based on a sensing current supplied through the sensing lines during a sensing period, and a power management driver configured to provide a first driving power and a second driving power to the pixels. The power management driver may include a first power supply configured to supply a first voltage of the first driving power to the pixels through a first power line during a sensing period, and supply a second voltage of the first driving power to the pixels through the first power line during a display period, a second power supply configured to supply a voltage of second driving power to the pixels through a second power line during the sensing period and the display period, a controller configured to control timing at which the first voltage of the first driving power is output and timing at which the second voltage of the first driving power is output during a transition period between the display period and the sensing period in response to a sensing control signal, and a fault detector configured to detect a reduced impedance fault in the first power line based on a current flowing through an output terminal during the sensing period.

In an exemplary embodiment, each of the pixels may include a light-emitting element, and a driving transistor configured to control a current flowing from a source of the second driving power into the light-emitting element, and electrically coupled to the light-emitting element. A source of the first driving power may be coupled to an electrode of the light-emitting element.

In an exemplary embodiment, the first power supply may include a voltage determiner configured to determine the first voltage based on input power, a first switch coupled between the voltage determiner and the first power line and configured to be turned on in response to a first enable signal, and a second switch coupled between the first power line and a voltage source, to which the second voltage is supplied, and configured to be turned on in response to a second enable signal.

In an exemplary embodiment, when the sensing period progresses after the display period, the first switch may be turned on after the second switch has been turned off during a first transition period between the display period and the sensing period, and when the display period progresses after the sensing period, the second switch may be turned on after the first switch has been turned off during a second transition period between the sensing period and the display period.

DETAILED DESCRIPTION

Exemplary embodiments of the present disclosure will hereinafter be described in detail with reference to the accompanying drawings. The same or like reference indicia may be used to designate the same or like features throughout the drawings, and repeated descriptions thereof may be omitted.

Figure 1:
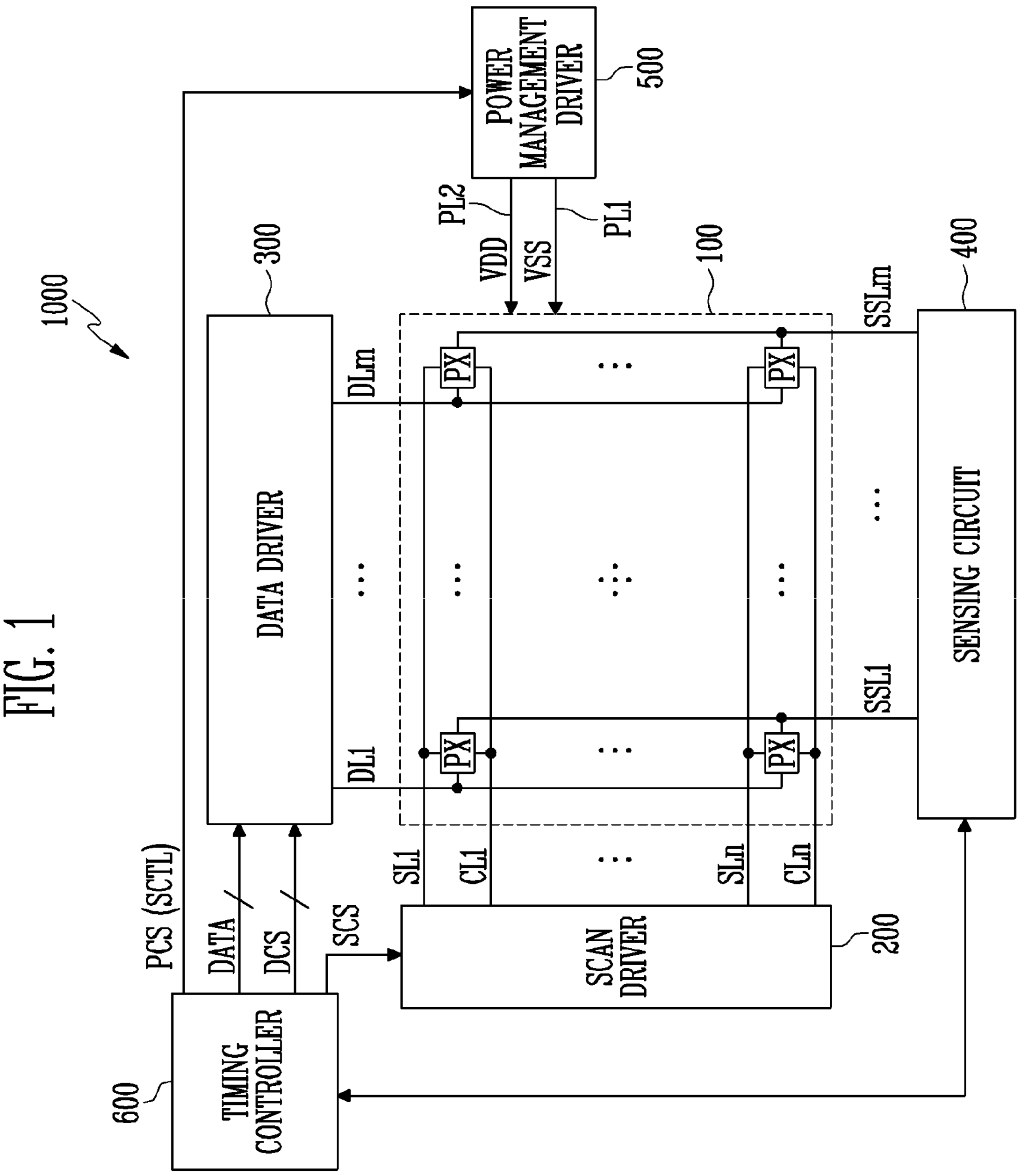
FIG. 1 is a schematic block diagram illustrating a display device according to an embodiment of the present disclosure.

FIG. 1 illustrates a display device according to an exemplary embodiment of the present disclosure.

Referring to FIG. 1, a display device 1000 may include a pixel unit 100, a scan driver 200, a data driver 300, a sensing circuit 400, a power management driver 500, and a timing controller 600.

The display device 1000 may be a flat panel display device, a flexible display device, a curved display device, a foldable display device, a bendable display device, or a stretchable display device. Also, the display device may be applied to a transparent display device, a head-mounted display device, a wearable display device, or the like. Further, the display device 1000 may be applied to various electronic devices, such as a smartphone, a tablet, a smart pad, a television (TV), or a monitor.

The display device 1000 may be implemented as an organic light-emitting display device. The configuration shown and described is only an example, and the configuration of the display device 1000 is not limited thereto. For example, the display device 1000 may be a self-emissive display device including an inorganic light-emitting element, a liquid crystal display device, or the like.

In an embodiment, the display device 1000 may be driven while the period thereof is divided into a display period during which an image is displayed and a sensing period during which the characteristics of driving transistors included in respective pixels PX are sensed. The sensed characteristics, in turn, may be used to detect faults, pixel conditions, and/or to adaptively adjust display output characteristics.

The pixel unit 100 may include pixels PX disposed to be coupled to data lines DL1 to DLm (where m is a natural number), scan lines SL1 to SLn (where n is a natural number), control lines CL1 to CLn, and sensing lines SSL1 to SSLm. The pixels PX may receive a voltage of a first driving power VDD through a first driving power terminal (indicated as PT1 in FIGS. 2A and 2B) of the power management driver 500 and a voltage of a second driving power VSS through a second driving power terminal (indicated as PT2 in FIGS. 2A and 2B) of the power management driver 500.

Although, in FIG. 1, n scan lines SL1 to SLn are illustrated, the present disclosure is not limited thereto. For example, in accordance with the circuit structure of each pixel PX, one or more control lines, scan lines, emission control lines, sensing lines, or the like may be additionally formed in the pixel unit 100.

In an embodiment, transistors included in each pixel PX may be N-type oxide Thin Film Transistors (TFTs). For example, such an oxide TFT may be a low-temperature polycrystalline oxide (LTPO) TFT. However, this is merely exemplary, and the transistors are not limited thereto. For example, an active pattern or semiconductor layer included in each transistor may include an inorganic semiconductor such as amorphous silicon or poly silicon, an organic semiconductor, or the like. At least one of the transistors included in the display device 1000 may be replaced with a P-type transistor.

The timing controller 600 may generate a data driving control signal DCS, a scan driving control signal SCS, and a power driving control signal PCS in response to externally supplied synchronization signals. The data driving control signal DCS generated by the timing controller 600 may be supplied to the data driver 300, the scan driving control signal SCS may be supplied to the scan driver 200, and the power driving control signal PCS may be supplied to the power management driver 500.

Further, the timing controller 600 may supply image data DATA in which externally supplied input image data is realigned to the data driver 300.

The data driving control signal DCS may include a source start signal and clock signals. The source start signal may control a time point at which the sampling of data starts. The clock signals may be used to control a sampling operation.

The scan driving control signal SCS may include a scan start signal, a control start signal, and clock signals. The scan start signal may control the timing of scan signals. The control start signal may control the timing of control signals. The clock signals may be used to shift the scan start signal and/or the control start signal.

The power driving control signal PCS may control the supply of the voltage of the first driving power VSS of the first driving power terminal and the voltage of the second driving voltage VDD of the second driving power terminal, respectively, including the actual signal levels of the voltages. In an embodiment, the power driving control signal PCS may include a sensing control signal SCTL for controlling the actual voltage level of the first driving power VSS at the first driving power terminal.

The timing controller 600 may further control the operation of the sensing circuit 400. For example, the timing controller 600 may control the timing at which a reference voltage is supplied to the pixels PX through the sensing lines SSL1 to SSLm and/or the timing at which currents generated in the pixels PX are sensed through the sensing lines SSL1 to SSLm.

The scan driver 200 may receive the scan driving control signal SCS from the timing controller 600. The scan driver 200 having received the scan driving control signal SCS may supply the scan signals to the scan lines SL1 to SLn, and may supply control signals to the control lines CL1 to CLn.

For example, the scan driver 200 may sequentially supply the scan signals to the scan lines SL1 to SLn. When the scan signals are sequentially supplied to the scan lines SL1 to SLn, the pixels PX may be selected on a horizontal line basis. For this operation, each scan signal may be set to a gate-on voltage, such as a logic high level, so that a transistor included in the corresponding pixel PX is turned on.

Similarly, the scan driver 200 may sequentially supply the control signals to the control lines CL1 to CLn. The control signals may be used to sense or extract driving currents flowing through the pixels, which may be based on currents flowing through the corresponding driving transistors. The timings and waveforms at which the scan signals and the control signals are supplied may be set differently depending on the display period and the sensing period.

Although, in FIG. 1, a single scan driver 200 is illustrated as outputting both scan signals and control signals, the present disclosure is not limited thereto. For example, the scan driver 200 may include a first scan driver which supplies scan signals to the pixel unit 100 and a second scan driver which supplies control signals to the pixel unit 100.

The data driver 300 may receive the data driving control signal DCS from the timing controller 600. The data driver 300 may supply data signals, such as sensing data signals, for detecting pixel characteristics to the pixel unit 100 during the sensing period. The data driver 300 may supply data signals for displaying an image to the pixel unit 100 based on the image data DATA during the display period.

The sensing circuit 400 may generate compensation values for compensating for the characteristic values of the pixels PX based on sensing values, such as sensing currents, provided from the sensing lines SSL1 to SSLm. In detail, the sensing circuit 400 may calculate or sense the amount of degradation of the driving transistor included in each pixel PX and/or the amount of degradation of the light-emitting element using sensing values, such as sensing currents, provided from the sensing lines SSL1 to SSLm. For example, the sensing circuit 400 may detect and compensate for the change in the characteristics of the light-emitting element occurring due to a change in the threshold voltage of the driving transistor included in each pixel PX, a change in the mobility of the driving transistor, and the degradation of the driving transistor.

In an embodiment, the sensing circuit 400 may supply a predetermined reference voltage to the pixels PX through the sensing lines SS1 to SSLm and receive currents or voltages extracted from the pixels PX during the sensing period. The extracted currents or voltages may correspond to the sensing values, and the sensing circuit 400 may detect the change in the characteristics of driving transistors based on the sensing values. The sensing circuit 400 may calculate compensation values for compensating for the input image data based on the detected characteristic change. The compensation values may be provided to the timing controller 600 or the data driver 300.

During the display period, the sensing circuit 400 may supply a predetermined reference voltage for displaying an image to the pixel unit 100 through the sensing lines SSL1 to SSLm.

Although, in FIG. 1, the sensing circuit 400 is illustrated as being a component separate from the timing controller 600, at least some of the components of the sensing circuit 400 may be included in the timing controller 600. For example, the sensing circuit 400 and the timing controller 600 may be formed in a single driver Integrated Circuit (IC). Furthermore, the data driver 300 may also be included in the timing controller 600. Therefore, at least some of the sensing circuit 400, the data driver 300, and the timing controller 600 may be formed in a single driver IC.

The power management driver 500 may supply the voltage of the first driving power VSS and the voltage of the second driving power VDD to the pixel unit 100 in response to the power driving control signal PCS. In an embodiment, the voltage at the first driving power terminal (the voltage of the first driving power VSS) may determine a cathode voltage of the light-emitting element, and the voltage at the second driving power terminal (the voltage of the second driving power VDD) may determine a drain voltage of the driving transistor.

In an embodiment, the power management driver 500 may supply a voltage to the first driving power terminal as a first voltage during the sensing period and a voltage to the first driving power terminal as a second voltage during the display period. The second voltage V2 may be a ground voltage GND, for example.

The voltage of the first driving power terminal may be supplied to the pixels PX through a first power line PL1, and the voltage of the second driving power terminal may be supplied to the pixels PX through a second power line PL2. In an embodiment, the first power line PL1 may be provided on a front surface of the pixel unit 100 in the form of a common electrode. Such a first power line PL1 may have a strong possibility of being short-circuited to or in contact with another line or conductive element due to a crack in or deformation of a display panel including the pixel unit 100, such as to cause a short-circuit or a reduced impedance fault. Through a short-circuit fault ("short") fault on the first power line PL1, an overcurrent may occur, and thus a risk of heat generation or may arise. Although the present disclosure shows detection of short-circuit and/or reduced impedance faults for illustrative purposes, it is not limited thereto. For example, open-circuit and/or increased impedance faults may similarly be detected.

Figure 2A:
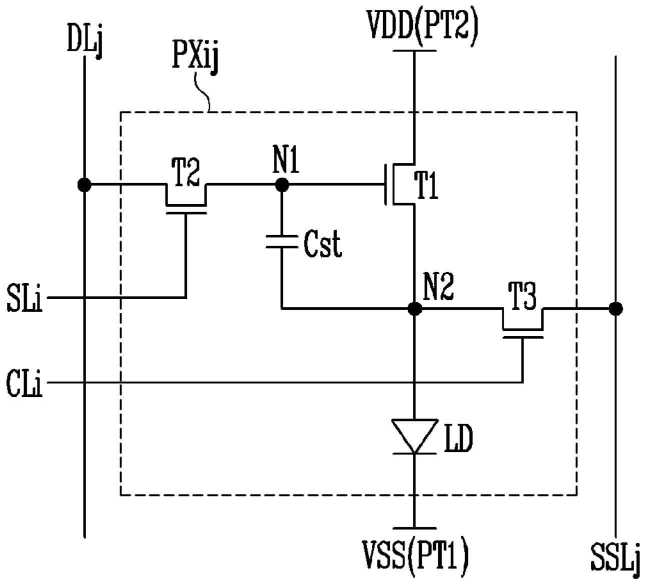
FIG. 2A is a schematic circuit diagram illustrating an example of a pixel included in the display device of FIG. 1.
Figure 2B:
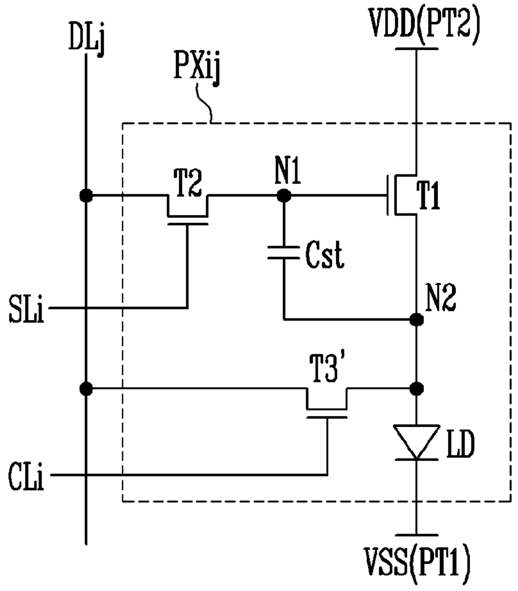
FIG. 2B is a schematic circuit diagram illustrating an example of a pixel included in the display device of FIG. 1.

FIG. 2A illustrates an example of a pixel included in the display device of FIG. 1, and FIG. 2B illustrates another example of a pixel included in the display device of FIG. 1.

In FIGS. 2A and 2B, for the convenience of description, a pixel which is located on an i-th horizontal line and is coupled to a j-th data line DLj is illustrated.

Referring to FIGS. 2A and 2B, a pixel PXij may include a light-emitting element LD, a first pixel transistor T1, such as a driving transistor, a second pixel transistor T2, a third pixel transistor T3 or T3', and a storage capacitor Cst.

A first electrode of the light-emitting element LD, which may be an anode or a cathode without limitation, is coupled to a second node N2, and a second electrode of the light-emitting element LD, which may be the other of the anode or cathode without limitation, is coupled to the VSS source of the first driving power terminal. The light-emitting element LD may generate light with predetermined luminance in accordance with the amount of current supplied from the first pixel transistor T1, such as through the driving transistor.

A first electrode of the first pixel transistor T1 may be coupled to a second driving power terminal PT2 to which a voltage of a second driving power VDD is supplied, and a second electrode thereof may be coupled to the first electrode of the light-emitting element LD. A gate electrode of the first transistor T1 may be coupled to a first node N1. The first pixel transistor T1 controls the amount of current flowing into the light-emitting element LD in accordance with the voltage of the first node N1.

A first electrode of the second pixel transistor T2 may be coupled to the data line DLj, and a second electrode thereof may be coupled to the first node N1. A gate electrode of the second pixel transistor T2 may be coupled to a scan line SLi. When a scan signal is supplied through the scan line SLi, the second pixel transistor T2 may be turned on, and may then transfer a data signal from the data line DLj to the first node N1.

In an embodiment, as illustrated in FIG. 2A, the third pixel transistor T3 may be coupled between a sensing line SSLj and the second electrode, such as the second node N2, of the first pixel transistor T1. A gate electrode of the third pixel transistor T3 may be coupled to a control line CLi. When a control signal is supplied through the control line CLi, the third pixel transistor T3 may be turned on, and may then electrically couple the sensing line SSLj and the second node N2, such as the second electrode of the first pixel transistor T1, to each other.

In an embodiment, when the third pixel transistor T3 is turned on, a reference voltage may be supplied to the second node N2 through the sensing line SSLj. In an embodiment, when the third pixel transistor T3 is turned on, a current generated in the first pixel transistor T1 may be supplied to a sensing circuit, such as the sensing circuit 400 of FIG. 1, through the sensing line SSLj.

In another embodiment, as illustrated in FIG. 2B, a third pixel transistor T3' may be coupled between the data line DLj and the second electrode, such as the second node N2, of the first pixel transistor T1. A gate electrode of the third pixel transistor T3' may be coupled to the control line CLi. When a control signal is supplied through the control line CLi, the third pixel transistor T3' may be turned on, and may then electrically couple the data line DLj and the second node N2, such as the second electrode of the first pixel transistor T1, to each other.

In an embodiment, when the third pixel transistor T3' is turned on, a reference voltage may be supplied to the second node N2 through the data line DLj. In an embodiment, when the third pixel transistor T3' is turned on, a current generated in the first pixel transistor T1 may be supplied to a sensing circuit (e.g., 400 of FIG. 1) through the data line DLj. In this way, the pixel PXij of FIG. 2B may receive the data signal through the data line DLj or transfer the current sensed from the pixel PXij to the sensing circuit (e.g., 400 of FIG. 1) through the data line DLj, in a time-division manner.

The storage capacitor Cst may be coupled between the first node N1 and the second node N2. The storage capacitor Cst may store a voltage corresponding to a voltage difference between the first node N1 and the second node N2.

In an embodiment of the present disclosure, the circuit structure of the pixel PXij is not limited by FIG. 2A or 2B. For example, the light-emitting element LD may be interposed between the second driving power terminal PT2 and the first electrode of the first pixel transistor T1. Further, although in FIG. 2A and FIG. 2B the pixel transistors T1 to T3 are illustrated as being NMOS transistors, the present disclosure is not limited thereto. For example, at least one of the pixel transistors T1 to T3 may be implemented as a PMOS transistor.

Figure 3:
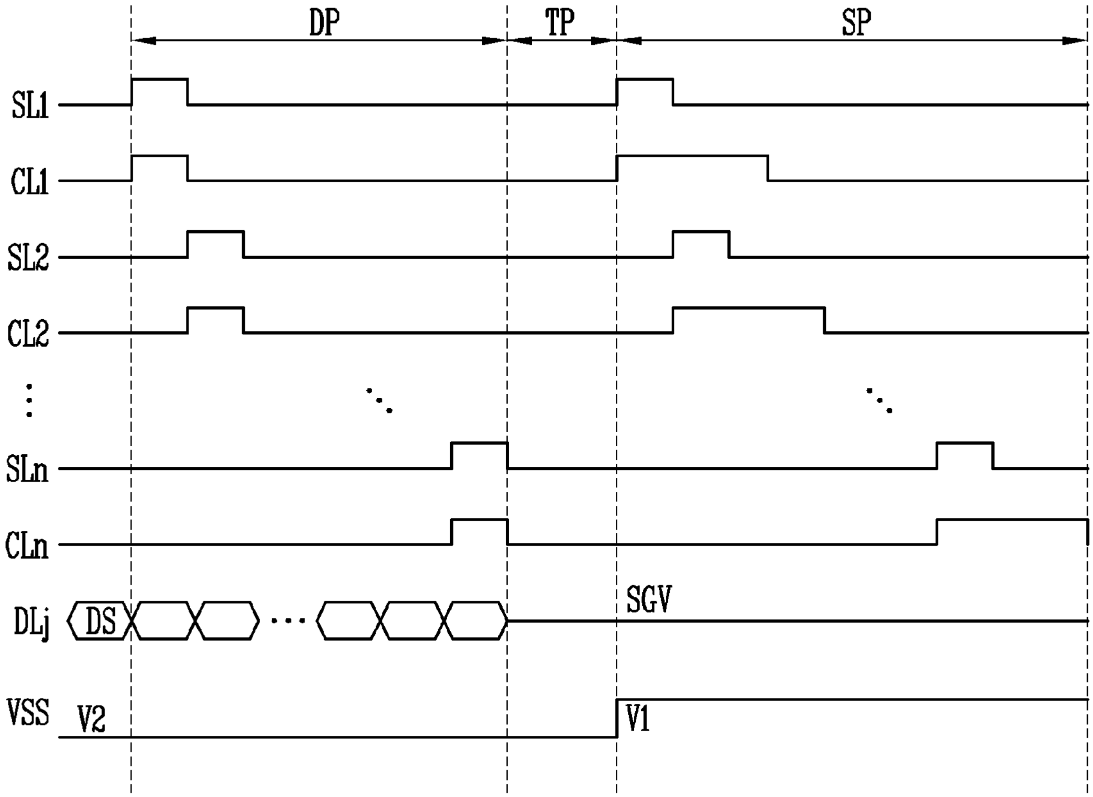
FIG. 3 is a graphical timing diagram illustrating an example of an operation of the display device of FIG. 1.
Figure 4:
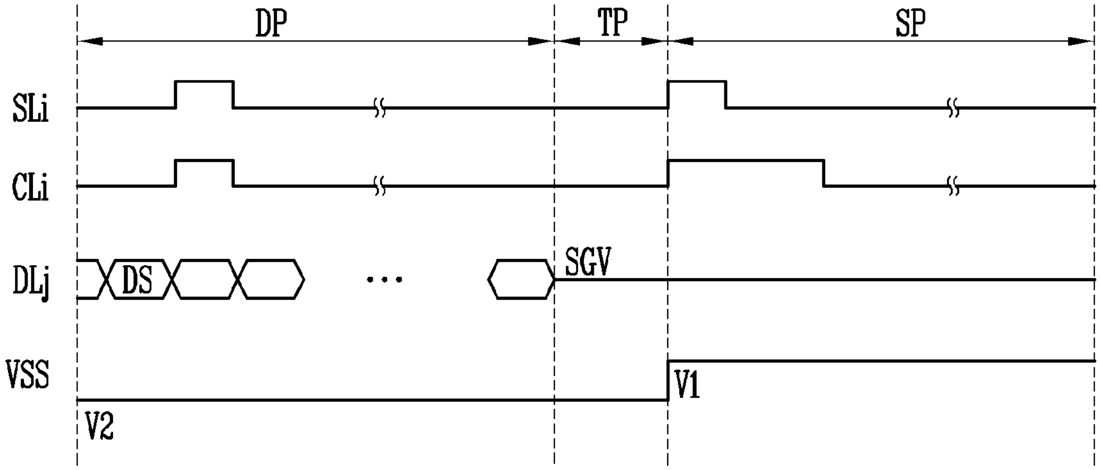
FIG. 4 is a graphical timing diagram illustrating an example of an operation of the pixel of FIG. 2.

FIG. 3 illustrates an example of an operation of the display device of FIG. 1, and FIG. 4 illustrates an example of the operation of the pixel of FIG. 2A or FIG. 2B.

Referring to FIGS. 1 to 4, the display device 1000 may be driven so that the period thereof is divided into a display period DP during which an image is displayed and a sensing period SP during which the characteristics of a first pixel transistor T1 included in each pixel PX are sensed.

In an embodiment, during the sensing period SP, image data may be compensated for based on the sensed characteristic information.

During the display period DP, a predetermined reference voltage, which is a constant voltage, may be supplied to sensing lines SSL1 to SSLm.

During the display period DP, the scan driver 200 may sequentially supply scan signals to the scan lines S1 to Sn. Also, during the display period DP, the scan driver 200 may sequentially supply control signals to control lines CL1 to CLn.

For an i-th horizontal line, a scan signal and a control signal may be supplied at substantially the same time. Therefore, the second pixel transistor T2 and the third pixel transistor T3 may be simultaneously turned on or off.

When the second pixel transistor T2 is turned on, a data signal DS corresponding to image data may be supplied from a respective data line DLj to the first node N1. When the third pixel transistor T3 is turned on, the reference voltage may be supplied to the second node N2. Therefore, the storage capacitor Cst may store a voltage corresponding to a voltage difference between the data signal DS and the reference voltage.

Here, since the reference voltage is set to a constant voltage, the voltage stored in the storage capacitor Cst may be stably determined by the data signal DS.

When the supply of the scan signal and the control signal to the i-th scan line SLi and the i-th control line CLi is stopped, the second pixel transistor T2 and the third pixel transistor T3 may be turned off.

Thereafter, the first pixel transistor T1 may control the amount of current (driving current) supplied to the light-emitting element LD in accordance with the voltage stored in the storage capacitor Cst. Therefore, the light-emitting element LD may emit light with luminance corresponding to the driving current of the first pixel transistor T1.

The power management driver may output a voltage of a first driving power VSS to a first driving power terminal PT1. In an embodiment, during the display period DP, the power management driver 500 may output a second voltage V2 of the first driving power VSS to the first driving power terminal PT1. During the display period DP, the first driving power terminal PT1 may be output in the form of a constant voltage. The second voltage V2 may have a voltage level sufficiently different from a first voltage V1 to be applied for image display. For example, the second voltage V2 may be a ground voltage.

In an embodiment, during the sensing period SP, the scan driver 200 may sequentially supply scan signals to the scan lines SL1 to SLn. Also, during the display period DP, the scan driver 200 may sequentially supply control signals to the control lines CL1 to CLn.

In an embodiment, the length of the control signals supplied during the sensing period SP may be longer than that of the control signals supplied during the display period DP. Also, during the sensing period SP, a part of the control signal supplied to an i-th control line CLi may overlap a scan signal supplied to an i-th scan line SLi. For example, the control signal supplied to the i-th control line CLi starts to be supplied simultaneously with the scan signal supplied to the i-th scan line SLi, and may be supplied for a time longer than that of the scan signal.

When the scan signal and the control signal are simultaneously supplied, the second and third pixel transistors T2 and T3 are turned on. When the second pixel transistor T2 is turned on, a sensing data signal or voltage SGV for sensing may be supplied from the respective data line DLj to the first node N1. Simultaneously with the supply of the sensing data signal, a reference voltage may be supplied to the second node N2 by the turn-on operation of the third pixel transistor T3. Therefore, the storage capacitor Cst may store a voltage corresponding to a voltage difference between the sensing data signal SGV and the reference voltage.

Thereafter, when the supply of the scan signal is stopped, the second pixel transistor T2 may be turned off. When the second pixel transistor T2 is turned off, the first node N1 may float. Accordingly, the voltage of the second node N2 may rise, and thus a sensing current may be generated through the first pixel transistor T1. The sensing current may be supplied to the sensing circuit (e.g., 400 of FIG. 1).

In an embodiment, during the sensing period SP, the power management driver 500 may output a first voltage V1 of the first driving power VSS to the first driving power terminal PT1 so as to calculate characteristics. For example, the first voltage V1 may be higher than the reference voltage (e.g., voltage supplied to the second node N2 through the sensing line SSLj). Further, the first voltage V1 may be set to a voltage higher than the second voltage V2.

In other words, the first voltage V1 may be set to the voltage higher than the voltage of the second node N2 so that the light-emitting element LD does not emit light. Accordingly, during the sensing period SP, a sensing current may flow through the sensing circuit 400 along the sensing line SSLj without flowing through the light-emitting element LD.

In an embodiment, a transition period TP may be inserted between the display period DP and the sensing period SP. During the transition period TP, the power management driver 500 may be controlled such that the timing at which the first voltage V1 of the first driving power terminal PT1 is output does not overlap the timing at which the second voltage V2 is output.

The timing diagram of FIG. 4 indicates signals supplied to the pixel PXij of FIG. 2 during the display period DP, the transition period TP, and the sensing period SP, and shows an operation scheme that is substantially the same as that described above with reference to FIG. 3. Thus, repeated descriptions thereof may be omitted.

Figure 5:
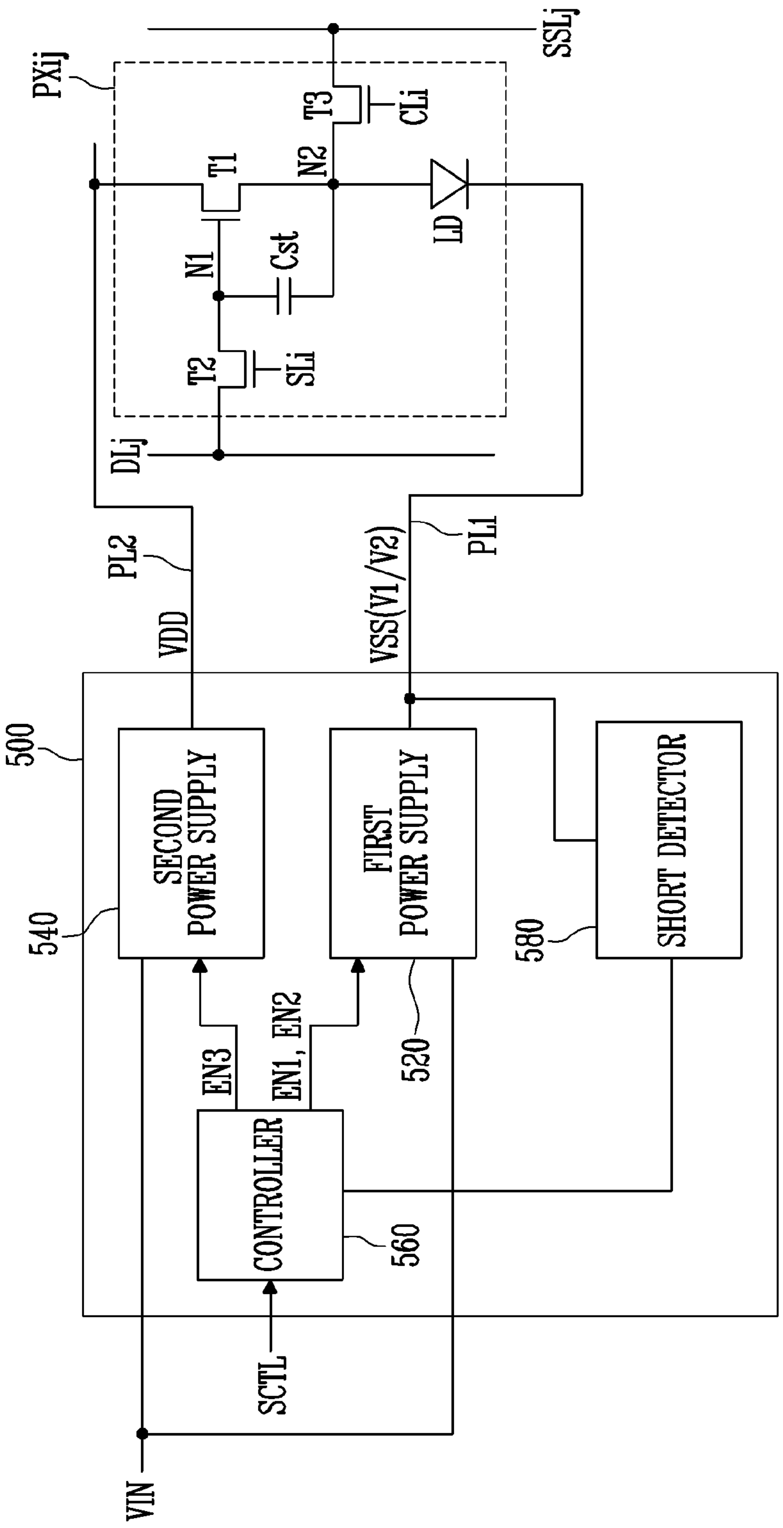
FIG. 5 is a schematic hybrid block/circuit diagram illustrating a power management driver according to an embodiment of the present disclosure.

FIG. 5 illustrates a power management driver according to an exemplary embodiment of the present disclosure.

Referring to FIGS. 1 and 5, the power management driver 500 may include a first power supply 520, a second power supply 540, a controller 560, and a short detector 580.

In an embodiment, the power management driver 500 may be mounted on the display device 1000 in the form of a driver IC. However, this is merely exemplary, and at least some of the components of the power management driver 500 may be directly formed on a display panel or may be included in the timing controller 600.

The first power supply 520 may supply the voltage of first driving power terminal PT1 to the first power line PL1. In an embodiment, the first power line PL1 may be coupled to a cathode electrode of a light-emitting element LD included in a pixel PXij.

The first power supply 520 may supply the first voltage V1 of the first driving power terminal PT1 to the pixel PXij through the first power line PL1 during a sensing period in response to a first enable signal EN1. Also, the first power supply 520 may supply the second voltage V2 of the first driving power terminal PT1 to the pixel PXij through the first power line PL1 during a display period in response to a second enable signal EN2.

In an embodiment, the first power supply 520 may convert input power VIN, supplied from an external power source (e.g., a battery or the like), into first driving power terminal PT1 having the first voltage V1 or the second voltage V2. For example, the first power supply 520 may have the structure of a boost converter or an inverting buck boost converter.

In an embodiment, the first power supply 520 may sequentially control the output of the first voltage V1 and the output of the second voltage V2 in response to the first and second enable signals EN1 and EN2. This operation may be described in greater detail later with reference to FIG. 6.

The second power supply 540 may supply the voltage of the second driving power terminal PT2 (the voltage of the second driving power VDD) to the pixel PXij through a second power line PL2 in response to a third enable signal EN3. In an embodiment, the second power line PL2 may be coupled to a drain electrode of a first pixel transistor T1 (or a driving transistor) of the pixel PXij.

The second driving power terminal PT2 may have a high-potential Direct Current (DC) voltage. For example, the voltage of the second driving power terminal PT2 may be higher than the first voltage V1 and the second voltage V2. However, this is merely exemplary, and the voltage of the second driving power terminal PT2 may be higher than the second voltage V2, but may be lower than or equal to the first voltage V1.

The second power supply 540 may convert the input power VIN supplied from an external power source (e.g., a battery or the like) into the voltage of the second driving power terminal PT2. For example, the second power supply 540 may have the structure of a boost converter.

In an embodiment, the second driving power terminal PT2 may supply a voltage having a constant magnitude to the second power line PL2, regardless of a sensing period, a transition period, and a display period. However, this is merely exemplary, and the voltage level of the second driving power terminal PT2 may change if necessary.

The controller 560 may control the timings at which the first voltage V1 and the second voltage V2 are respectively output during the transition period in response to the sensing control signal SCTL. In an embodiment, the controller 560 may generate the first enable signal EN1 by delaying the sensing control signal SCTL, and may generate the second enable signal EN2 by inverting and delaying the sensing control signal SCTL.

Also, the controller 560 may control the detection operation and/or the protection operation of the short detector 580. For example, the controller 560 may limit the output of a protection signal (or a shutdown signal) based on short detection during a masking period existing in an initial stage of the sensing period.

In accordance with an embodiment, the controller 560 may analyze a glitch (or noise) in a detected value, which is detected by the short detector 580, and may then determine whether to stop the driving of the power management driver 500. For example, when the time during which noise in the detected value is detected is longer than a predetermined reference time (e.g., a noise ignorance time), the controller 560 may control the power management driver 500 so that the power management driver 500 is not shut down. Furthermore, when the time during which noise is detected is shorter than or equal to the reference time, the power management driver 500 may be controlled such that such noise is ignored when power shutdown is controlled.

The short detector 580 may detect a short in the second power line PL2 based on current flowing through an output terminal (e.g., the second power line PL2) during the sensing period. Since a current (e.g., a sensing current) generated in the first pixel transistor T1 of the pixel PXij flows into the sensing line SSLj through the third pixel transistor T3 during the sensing period, a current path to the normal first power line PL1 is not formed, or alternatively, a very small amount of current flows through the first power line PL1.

However, when the first power line PL1 is in contact with or is shorted to other lines, a current path may be formed through a short point. For example, a line for transferring a logic high level (e.g., about 25 V) of a scan signal or like may be shorted to the first power line PL1. In this case, since the logic high level is higher than the output voltage of the first power supply 520, a negative current sinking from the first power line PL1 to the first power supply 520 may be detected.

In contrast, a line for transferring a logic low level (e.g., about −10 V) of a scan signal or like may be shorted to the first power line PL1. In this case, since the logic low level is lower than the output voltage of the first power supply 520, a positive current that flows from the output terminal of the first power supply 520 into the first power line PL1 may be detected.

The short detector 580 may extract such a negative current and a positive current, and may then output a protection signal for protecting the power management driver 500 and the display device 1000 based on the result of a comparison between the extracted values and a reference value. Based on the protection signal, the driving of the power management driver 500 and/or the display device 1000 may be stopped or shut down.

Figure 6:
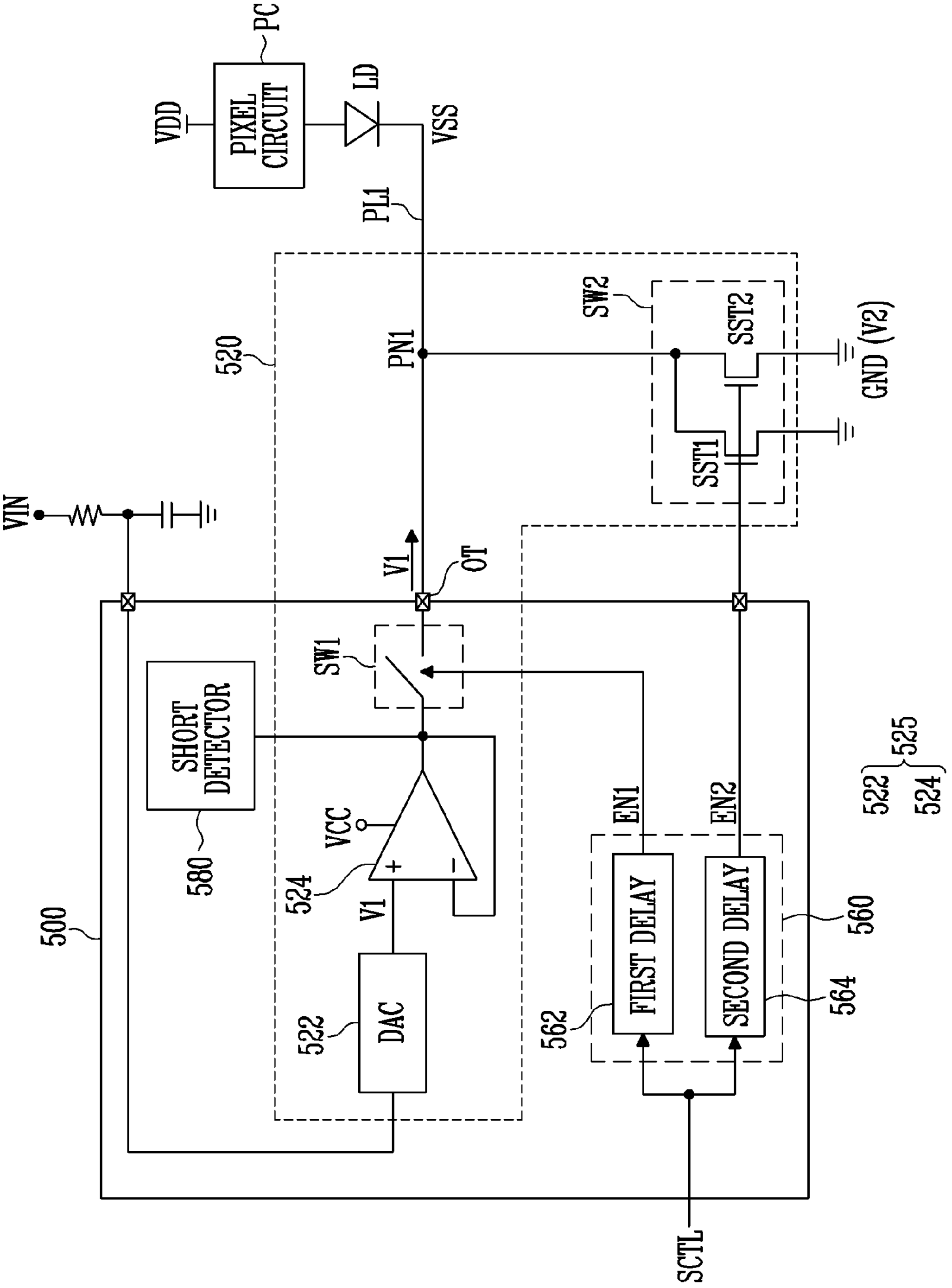
FIG. 6 is a schematic hybrid block/circuit diagram illustrating an example of the power management driver of FIG. 5.

FIG. 6 illustrates an example of the power management driver of FIG. 5.

For convenience of description, FIG. 6 illustrates an embodiment in which some components of the first power supply 520 and the controller 560 are embodied.

Referring to FIGS. 5 and 6, the power management driver 500 may include a first power supply 520, a second power supply 540, a controller 560, and a short detector 580.

The first power supply 520 may include a voltage determiner 525, a first switch 201, and a second switch 202. The first power supply 520 may supply a first voltage V1 to a first power line PL1 during a sensing period, and may supply a second voltage V2 to the first power line PL1 during a display period.

The voltage determiner 525 may determine the first voltage V1 based on input power VIN. In an embodiment, the voltage determiner 525 may include a digital-to-analog converter (DAC) 522 and a voltage output circuit 524. However, this is merely exemplary, and the voltage determiner 525 may further include an additional boost converter component for generating the voltage of the first driving power terminal (i.e., the voltage of the first driving power VSS).

The DAC 522 may output the first voltage V1 having a voltage level corresponding to a driving condition based on the voltage of the input power VIN. For example, the first voltage V1, which is analog output, may be determined based on an 8-bit digital input value.

The voltage output circuit 524 may temporarily store the first voltage V1, and then output the first voltage V1 to an output terminal OT. Although FIG. 6 illustrates a buffer configuration which is operated by DC driving power VCC and outputs an input voltage, and a configuration in which the first switch SW1 is coupled, the present disclosure is not limited thereto. For example, the voltage output circuit 524 may also be implemented as a three-state, or tri-state buffer which further includes an enable terminal for switching on or off a connection between the input and output terminals thereof.

The first switch SW1 may be coupled between the voltage determiner 525 (e.g., the voltage output circuit 524) and the first power line PL1. The first switch SW1 may be turned on in response to a first enable signal EN1. When the first switch SW1 is turned on, the first voltage V1 may be supplied to the first power line PL1 through a predetermined node PN1. In an embodiment, the first switch SW1 may be implemented using various structures, such as a Bipolar Junction Transistor (BJT) and a Field Effect Transistor (FET), for example, a Metal Oxide Semiconductor Field Effect Transistor (MOSFET).

The second switch SW2 may be coupled between the first power line PL1 and a voltage source to which the second voltage V2 is supplied. In an embodiment, the voltage source may be ground GND, and the second voltage V2 may be a ground voltage. However, this structure is merely exemplary, and the magnitude of the second voltage V2 is not limited thereto. For example, as the second voltage V2, any voltage that is capable of guaranteeing stable driving of a pixel circuit PC and a light-emitting element LD of the pixel PXij during a display period is sufficient. The second voltage V2 may be a predetermined negative voltage. Here, the pixel circuit PC may denote a configuration corresponding to the transistors T1, T2, and T3 and the storage capacitor Cst, other than the light-emitting element LD, in the configurations of the pixel PXij of FIG. 2A or FIG. 2B.

The second switch SW2 may be turned on in response to a second enable signal EN2. When the second switch SW2 is turned on, the first power line PL1 may be electrically coupled to the ground GND, and the voltage of the first driving power terminal may be set to the ground voltage.

In an embodiment, the second switch SW2 may include a first sub-transistor SST1 and a second sub-transistor SST2. The first and second sub-transistors SST1 and SST2 may be coupled in parallel between the node PN1 and the ground. Gate electrodes of the first and second sub-transistors SST1 and SST2 may receive the second enable signal EN2 in common.

In an embodiment, the controller 560 may include a first delay component 562 and a second delay component 564.

The first delay component 562 may generate the first enable signal EN1 by delaying a sensing control signal SCTL. The sensing control signal SCTL may have an activation level (or a gate-on level) during a sensing period, and may have a deactivation level (or a gate-off level) during a display period. The first delay component 562 may control a time point at which the first enable signal EN1 makes a transition during a transition period.

The second delay component 564 may generate the second enable signal EN2 by inverting and delaying the sensing control signal SCTL. In an embodiment, the second delay component 564 may include an inverter which inverts the sensing control signal SCTL. The second delay component 564 may control a time point at which the second enable signal EN2 makes a transition during a transition period.

When the first and second switches SW1 and SW2 are simultaneously turned on, the output terminal OT is electrically coupled to the ground GND. Accordingly, the output of the voltage determiner 525 is provided to the ground GND through the node PN1, and thus an overcurrent may occur.

By the driving of the first and second delay components 562 and 564, the turn-on times and turn-on timings of the first and second switches SW1 and SW2 may be controlled. Accordingly, a driving error, in which the first and second switches SW1 and SW2 are simultaneously turned on, and the occurrence of an overcurrent (and heat generation) attributable to the driving error may be prevented.

Each of the first and second delay components 562 and 564 may include components, such as various types of known signal deformation circuits (or delay circuits) and shift registers.

Figure 7:
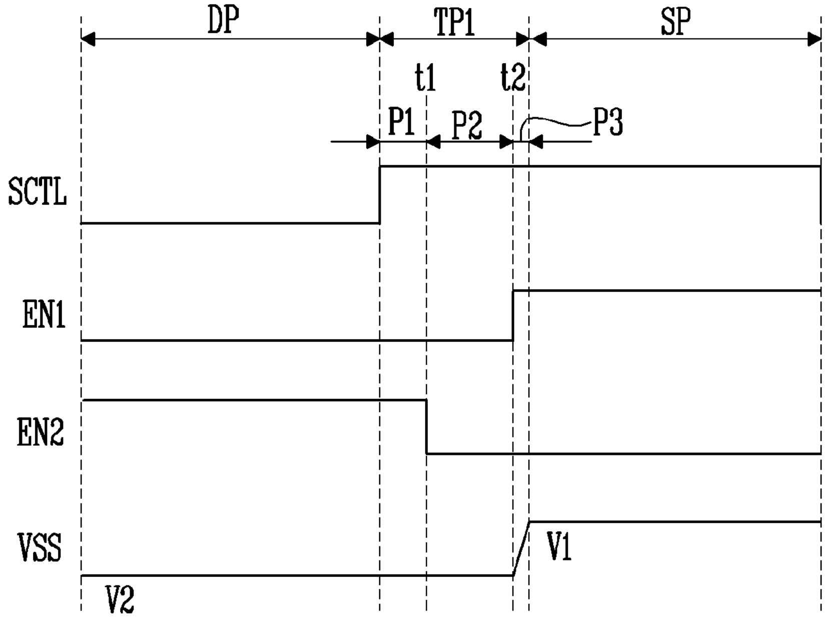
FIG. 7 is a graphical timing diagram illustrating an example of an operation of the power management driver of FIG. 6.

FIG. 7 illustrates an example of an operation of the power management driver of FIG. 6.

Referring to FIGS. 1, 6, and 7, the first and second delay components 562 and 564 may respectively output the first and second enable signals EN1 and EN2 by controlling the sensing control signal SCTL.

The driving of the display device 1000 may include a display period DP, a sensing period SP, and a first transition period TP1 inserted between the display period DP and the sensing period SP.

In an embodiment, the driving scheme of FIG. 7 may be applied to a display-off or power-off operation of the display device 1000. For example, after the display operation has been terminated, sensing of the pixels PX may be performed. The first transition period TP1 may be activated after the display period DP. For example, the first transition period TP1 may be a preparation period for sensing the pixels PX during the sensing period SP. The length of the first transition period TP1 may be set to about 60 μs. However, this is merely exemplary, and the length of the first transition period TP1 may be set depending on resolution, the size of the display device 1000, driving frequency, or the like.

The sensing control signal SCTL may have a gate-on level during the sensing period SP, and a gate-off level during the display period DP. Hereinafter, a description will be made under the premise that a logic high level is a gate-on level.

During the display period, the first enable signal EN1 may have a gate-off level, and the second enable signal EN2 may have a gate-on level. During the display period DP, the first switch SW1 may be turned off, and the second switch SW2 may be turned on. Therefore, the source of the first driving power terminal may be coupled to the ground GND, and may have the second voltage V2.

During the first transition period TP1, a scan signal and a control signal are not supplied. In an embodiment, during the first transition period TP1, the first switch SW1 may be turned on after the second switch SW2 has been turned off.

The second enable signal EN2 may make a transition from a gate-on level to a gate-off level at a first time point t1 of the first transition period TP1. Therefore, the second switch SW2 may remain turned on during a first period P1 of the first transition period TP1, and may be turned off at the first time point t1. For example, the length of the first period P1 may be set to 1 μs.

The second delay component 564 may delay an inverted signal of the sensing control signal SCTL to the first time point t1, and may output the delayed signal as the second enable signal EN2. Because the voltage of the first driving power terminal is maintained at the second voltage V2 during the first period P1, the display of an image may be stably performed during the display period DP.

The second enable signal EN2 may have a gate-off level in response to the sensing control signal SCTL during the sensing period SP.

Next, at a second time point t2, the first enable signal EN1 may make a transition from a gate-off level to a gate-on level. The first switch SW1 may be turned on at the second time point t2. When the first switch SW1 is turned on, the voltage of the first driving power terminal may be output as the first voltage V1.

The first delay component 562 may delay the sensing control signal SCTL to the second time point t2, and may output the delayed signal as the first enable signal EN1. The first enable signal EN1 may have a gate-on level in response to the sensing control signal SCTL during the sensing period SP.

During the second period P2 between the first time point t1 and the second time point t2, both the first and second switches SW1 and SW2 may be turned off. The length of the second period P2 may be set to about 10 μs to 60 μs. Here, since the time during which the first and second switches SW1 and SW2 are turned off is very short, the first power line PL1 may be maintained at the second voltage V2.

That is, since the time point at which the second switch SW2 is turned off is clearly separated from the time point at which the first switch SW1 is turned on, heat generation and unnecessary power consumption that may occur when an output value from the output terminal OT is supplied to the ground GND may be prevented or minimized.

During the sensing period SP, a scan signal and a control signal may be supplied again to the pixels PX. In an embodiment, after the second time point t2, the sensing period SP may start. Accordingly, during a third period P3, the voltage of the first driving power terminal may rise up to the first voltage V1. Therefore, during the sensing period SP, the first voltage V1 of the first driving power terminal may be stably supplied.

However, this is merely exemplary, and the second time point t2 may be the same as the start point of the sensing period SP.

Figure 8:
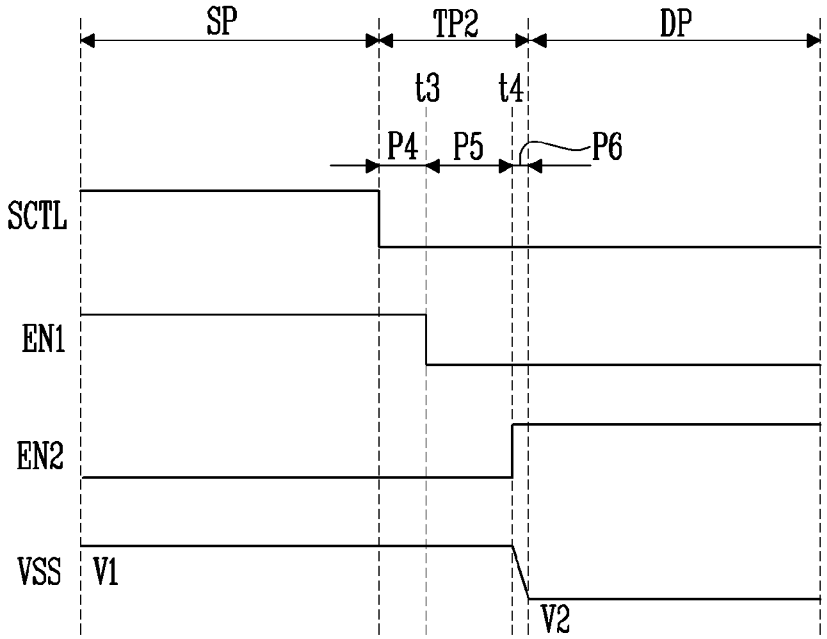
FIG. 8 is a graphical timing diagram illustrating an example of an operation of the power management driver of FIG. 6.

FIG. 8 illustrates an example of an operation of the power management driver of FIG. 6.

Referring to FIGS. 1, 6, 7, and 8, the first and second delay components 562 and 564 may respectively output the first and second enable signals EN1 and EN2 by controlling the sensing control signal SCTL.

In an embodiment, the driving scheme of FIG. 8 may also be applied to a display-on or a power-on operation of the display device 1000. For example, before a display operation starts, sensing of the pixels PX may be performed. A second transition period TP2 may be activated after the sensing period SP. For example, the second transition period TP2 may be a preparation period for displaying an image during the display period DP. The length of the second transition period TP2 may be set to about 60 μs. However, this is merely exemplary, and the length of the second transition period TP2 may be set depending on resolution, the size of the display device 1000, driving frequency, or the like.

During the second transition period TP2, a scan signal and a control signal are not supplied. In an embodiment, during the second transition period TP2, the second switch SW2 may be turned on after the first switch SW1 has been turned off.

The first enable signal EN1 may make a transition from a gate-on level to a gate-off level at a third time point t3 of the second transition period TP2. Therefore, the first switch SW1 may remain turned on during a fourth period P4 of the second transition period TP2, and may be turned off at the third time point t3.

In an embodiment, the length of the fourth period P4 may correspond to the sum of the lengths of the first period P1 and the second period P2. The length of the fourth period P4 may correspond to the time by which the first enable signal EN1 is delayed from the sensing control signal SCTL. The length of the fourth period P4 may be set to about 10 μs to 60 μs. However, this structure is merely exemplary, and the length of the fourth period P4 is not limited thereto.

The first delay component 562 may delay the sensing control signal SCTL to the third time point t3, and may output the delayed signal as the first enable signal EN1. Because the voltage of the first driving power terminal is maintained at the first voltage V1 during the fourth period P4, a sensing operation may be stably performed during the sensing period SP.

Thereafter, at a fourth time point t4, the second enable signal EN2 may make a transition from a gate-off level to a gate-on level. The second switch SW2 may be turned on at the fourth time point t4. When the second switch SW2 is turned on, the voltage of the first driving power terminal may be output as the second voltage V2.

The second delay component 564 may delay an inverted signal of the sensing control signal SCTL to the fourth time point t4, and may output the delayed signal as the second enable signal EN2.

During a fifth period P5 between the third time point t3 and the fourth time point t4, both the first and second switches SW1 and SW2 may be turned off. The length of the fifth period P5 may be set to about 10 μs to 60 μs. Here, since the time during which the first and second switches SW1 and SW2 are turned off is very short, the first power line PL1 may be maintained at the first voltage V1.

In an embodiment, after the fourth time point t4, the display period DP may start. Accordingly, during a sixth period P6, the voltage of the first driving power terminal may drop to the second voltage V2.

That is, since the time point at which the first switch SW1 is turned off is clearly separated from the time point at which the second switch SW2 is turned on through the first transition period TP1 and the second transition period TP2, heat generation and the consumption of unnecessary power that may occur when the output of the output terminal OT is supplied to the ground GND may be prevented or minimized.

Figure 9:
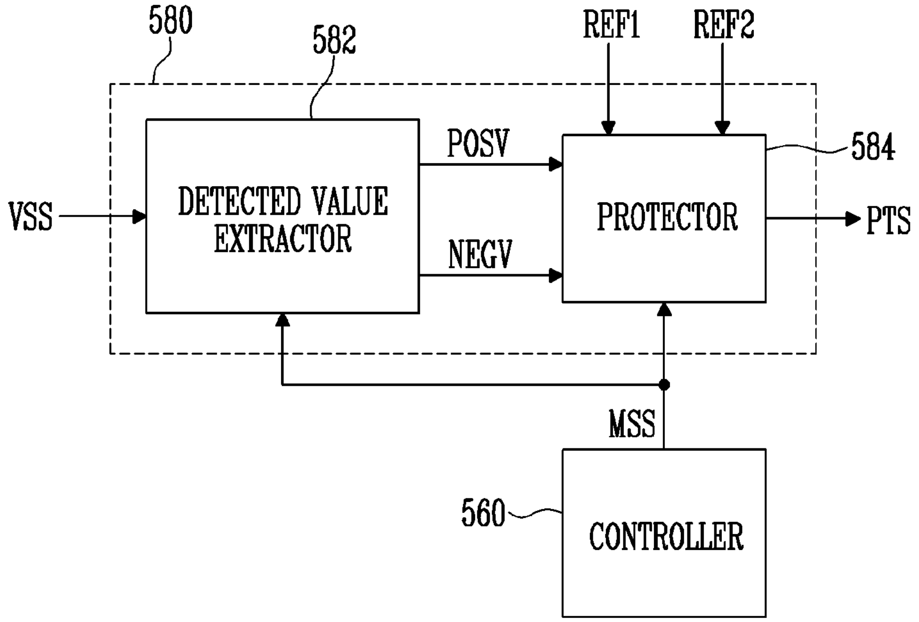
FIG. 9 is a schematic block diagram illustrating an example of a short-circuit fault ("short") detector and a controller included in the power management driver of FIG. 6.

FIG. 9 illustrates an example of the short detector and the controller included in the power management driver of FIG.

Figure 10:
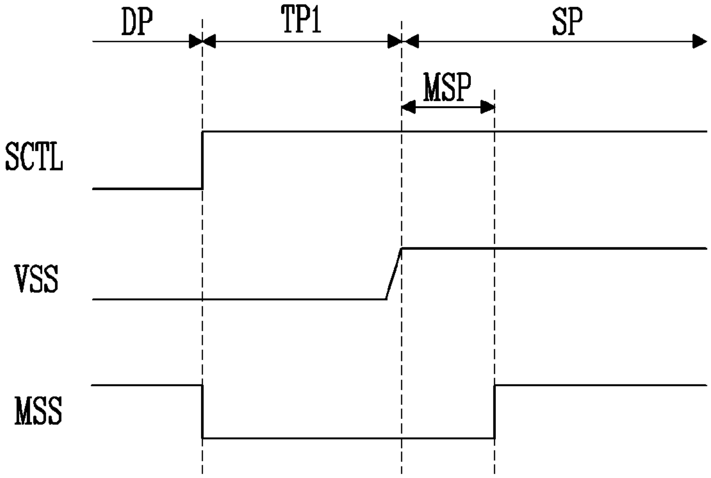
FIG. 10 is a graphical timing diagram illustrating an example of an operation of the short detector and the controller of FIG. 9.

6, and FIG. 10 illustrates an example of an operation of the short detector and the controller of FIG. 9.

Referring to FIGS. 6, 9, and 10, the short detector 580 may include a detected value extractor 582 and a protector 584.

The detected value extractor 582 may extract a first detected value POSV based on a positive current flowing through the output terminal OT during a sensing period SP, and may extract a second detected value NEGV based on a negative current flowing therethrough. The first detected value POSV and the second detected value NEGV may be extracted as voltage values or current values.

In an embodiment, the detected value extractor 582 may extract the first detected value POSV and the second detected value NEGV based on a positive current and/or a negative current that flow into an amplifier-type voltage output circuit 524.

During a display period DP, the first switch SW1 is turned off, and thus the current detection and extraction by the detected value extractor 582 are not performed.

The protector 584 may be supplied with the first detected value POSV and the second detected value NEGV. The protector 584 may generate a protection signal PTS based on the first detected value POSV and the second detected value NEGV. In an embodiment, the protector 584 may compare the first detected value POSV with a first reference value REF1, and may compare the second detected value NEGV with a second reference value REF2.

When the first detected value POSV or the second detected value NEGV is greater than a predetermined reference, the protector 584 may determine that a short has occurred in the first power line PL1, and may output the protection signal PTS. The protection signal PTS may be used to determine whether to drive the power management driver 500 and/or the display device (e.g., 1000 of FIG. 1).

In an initial stage of the sensing period SP, the first and second detected values POSV and NEGV may be in unstable states due to a change in the voltage level of the first driving power terminal and variation in the driving of pixels. For example, in the initial stage of the sensing period SP, the first and second detected values POSV and NEGV may contain unnecessary noise. Therefore, there is the possibility of being falsely determined that a short has occurred due to the noise.

In an embodiment, in order to prevent such a driving error, the controller 560 may limit the output of the protection signal PTS during a masking period MSP. For example, the controller may supply a masking signal MSS to the short detector 580 during a transition period TP and the masking period MSP. In FIG. 10, the masking signal MSS may be set to a gate-off level, such as a logic low level, for deactivating the operation of a predetermined component.

The masking period MSP may be a preset initial period of the sensing period. For example, the masking period MSP may be a period during which the detection of current/voltage by the detected value extractor 582 and/or the output of the protection signal PTS by the protector 584 are suppressed or masked. The length of the masking period MSP may be set to about 1 ms to 5 ms.

The detected value extractor 582 does not extract the first detected value POSV and the second detected value NEGV in response to the masking signal MSS. Alternatively, the protector 584 may block the output of the protection signal PTS in response to the masking signal MSS.

As described above, the masking period MSP may be inserted into the initial stage of the sensing period PS, thus improving the reliability of short detection and protective driving by the short detector 580 may be improved.

Figure 11:
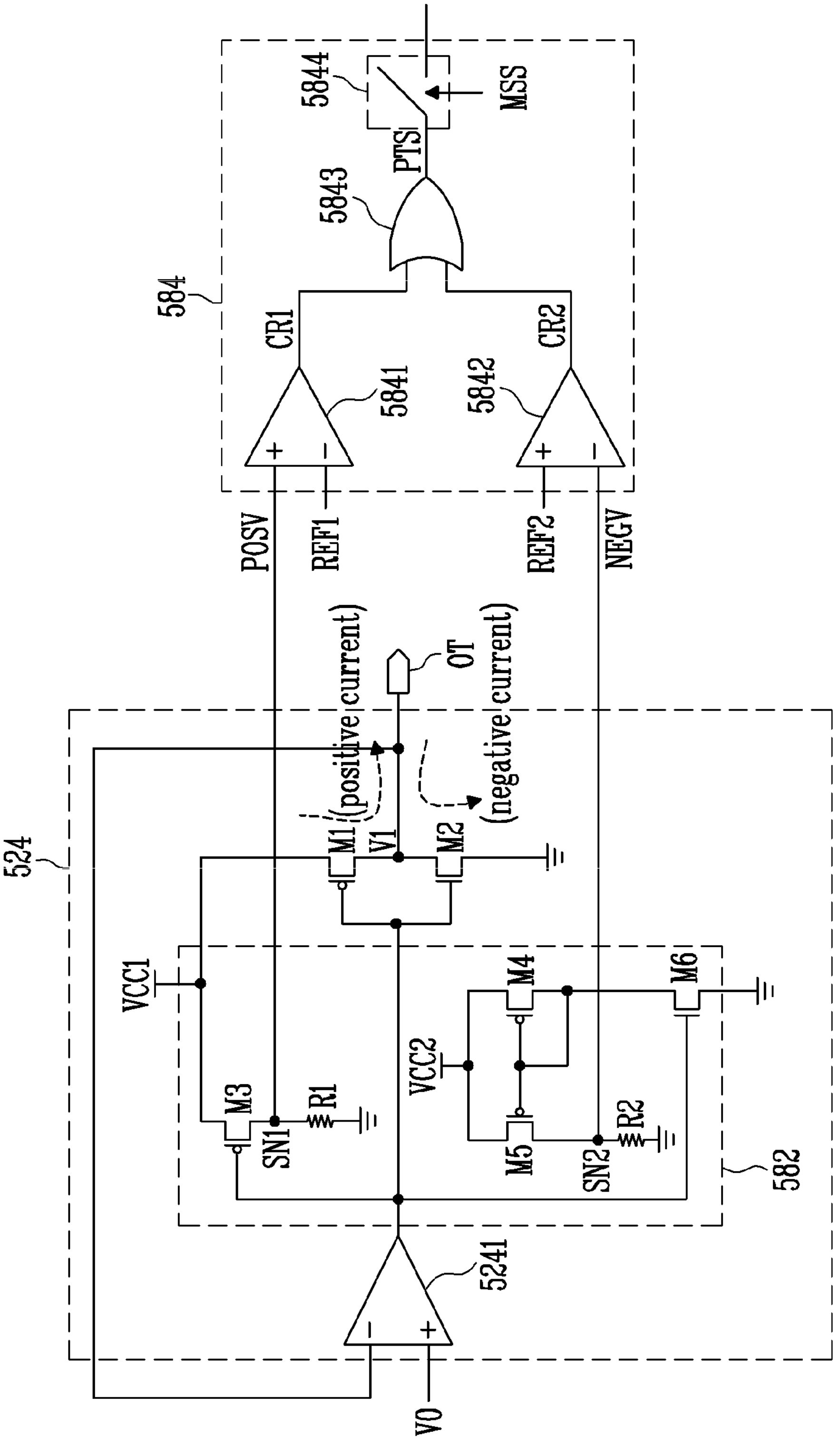
FIG. 11 is a schematic circuit diagram illustrating an example of the short detector included in the power management driver of FIG. 6.

FIG. 11 illustrates an example of the short detector included in the power management driver of FIG. 6.

Referring to FIGS. 6, 9, 10, and 11, the short detector 580 may include a detected value extractor 582 and a protector 584.

In an embodiment, the detected value extractor 582 may be configured in or coupled to an amplifier-type voltage output circuit 524. The voltage output circuit 524 may include a comparator 5241, a first transistor M1, and a second transistor M2.

The comparator 5241 may compare an internal driving voltage V0 with a first voltage V1 output from the comparator 5241, and may output a voltage corresponding to the result of the comparison.

The first transistor M1 may be coupled between the source of first DC power VCC1 and an output terminal OT. The second transistor M2 may be coupled between the output terminal OT and the ground. Gate electrodes of the first and second transistors M1 and M2 may be coupled to an output terminal of the comparator 5241. The first transistor M1 may be a PMOS transistor, and the second transistor M2 may be an NMOS transistor.

Depending on the result of the comparison between the internal driving voltage V0 and the first voltage V1 by the comparator 5241, one of the first and second transistors M1 and M2 is turned on, and thus the first voltage V1 having a constant voltage level may be output through the output terminal OT.

The detected value extractor 582 may include third to sixth transistors M3 to M6 and first and second resistors R1 and R2.

The detected value extractor 582 may extract a first detected value POSV using the third transistor M3 coupled between the source of the first DC power VCC1 and the ground. A gate electrode of the third transistor M3 may receive the output voltage of the comparator 5241. In an embodiment, the third transistor M3 may be a PMOS transistor.

The first resistor R1 may be coupled between the third transistor M3 and the ground.

When the third transistor M3 is turned on, a positive current flows into the ground through the third transistor M3 and the first resistor R1, and the voltage of a first sensing node SN1 may be extracted as the first detected value POSV.

In an embodiment, the size of the third transistor M3 may be smaller than that of the first transistor M1. For example, a channel length of the third transistor M3 may be shorter than that of the first transistor M1. Accordingly, the positive current may be converted into a value corresponding to the ratio of the channel lengths, and the value may be extracted.

The detected value extractor 582 may extract a second detected value NEGV using the fourth to sixth transistors M4 to M6.

The fourth transistor M4 may be coupled between the source of second DC power VCC2 and the sixth transistor M6, and the fifth transistor M5 may be coupled between the source of second DC power VCC2 and the second resistor R2. Gate electrodes of the fourth and fifth transistors M4 and M5 may be coupled to each other, and the gate electrode and the drain electrode of the fourth transistor M4 may be coupled to each other. That is, the fourth and fifth transistors M4 and M5 may be coupled in the structure of a current minor. In an embodiment, the fourth and fifth transistors M4 and M5 may be PMOS transistors.

The sixth transistor M6 may be coupled between the fourth transistor M4 and ground, and may include a gate electrode coupled to the output terminal of the comparator 5241. The sixth transistor M6 may be an NMOS transistor.

When the second transistor M2 and the sixth transistor M6 are turned on, a negative current or a current, obtained by reducing the negative current at a predetermined rate, may flow through a second sensing node SN2 by means of the driving of the current minor composed of the fourth and fifth transistors M4 and M5. Therefore, the voltage of the second sensing node SN2 may be extracted as the second detected value NEGV.

In an embodiment, the sizes of the fourth and fifth transistors M4 and M5 may be smaller than that of the second transistor M2. For example, the channel lengths of the fourth and fifth transistors M4 and M5 may be shorter than that of the second transistor M2. Also, the channel lengths of the fourth transistor M4 and the fifth transistor M5 may be identical to or different from each other. Accordingly, the magnitude of the negative current may be controlled depending on the ratio of the channel lengths.

Meanwhile, the voltage levels of the first DC power VCC1 and the second DC power VCC2 may be identical to or different from each other.

When a short occurs in the first power line PL1, the absolute values of the first detected value POSV and/or the second detected value NEGV may increase due to the occurrence of an overcurrent.

The protector 584 may include a first comparator 5841, a second comparator 5842, a logical OR operating component 5843, and a switch 5844.

The first comparator 5841 may compare the first detected value POSV with a first reference value REF1, and may output a first result CR1. When the first detected value POSV is greater than the first reference value REF1, it may be determined that a short has occurred between the first power line PL1 and a line for transferring a voltage higher than the first voltage V1. Here, the first result CR1 may have a first level (e.g., a logic high level). When the first detected value POSV is less than or equal to the first reference value REF1, the first result CR1 may have a second level (e.g., a logic low level).

The second comparator 5842 may compare the second detected value NEGV with a second reference value REF2, and may output a second result CR2. When the magnitude (or absolute value) of the second detected value NEGV is greater than the second reference value REF2, it may be determined that a short has occurred between the first power line PL1 and a line for transferring a voltage lower than the first voltage V1. Here, the second result CR2 may have a first level (e.g., a logic high level). When the absolute value of the second detected value NEGV is less than or equal to the second reference value REF2, the second result CR2 may have a second level (e.g., a logic low level).

The logical OR operating component 5843 may generate a protection signal PTS based on the result of a logical OR operation on the first result CR1 and the second result CR2. In an embodiment, when at least one of the first result CR1 and the second result CR2 has a first level, the logical OR operating component 5843 may output the protection signal PTS (or a protection signal having a logic high level). In contrast, when both the first result CR1 and the second result CR2 have a second level, the logical OR operating component 5843 does not output a protection signal PTS (alternatively, outputs a protection signal PTS having a logic low level).

In an embodiment, the switch 5844 may control the output of the protection signal PTS during the sensing period SP in response to a masking signal MSS. That is, by the output of the masking signal MSS (or the output of the masking signal MSS having a gate-off level), the switch 5844 may be turned off. Therefore, during a masking period MSP, the output of the protection signal PTS may be blocked.

Figure 12:
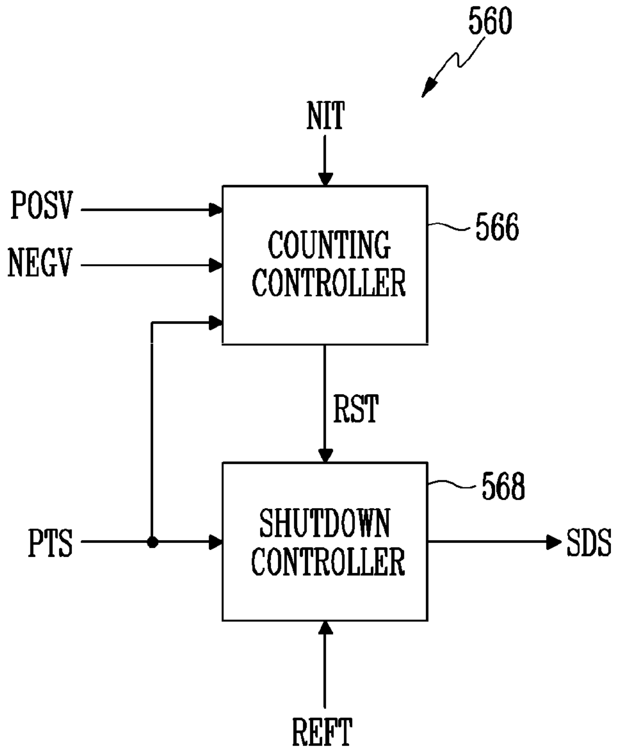
FIG. 12 is a schematic block diagram illustrating an example of the controller included in the power management driver of FIG. 6.
Figure 13:
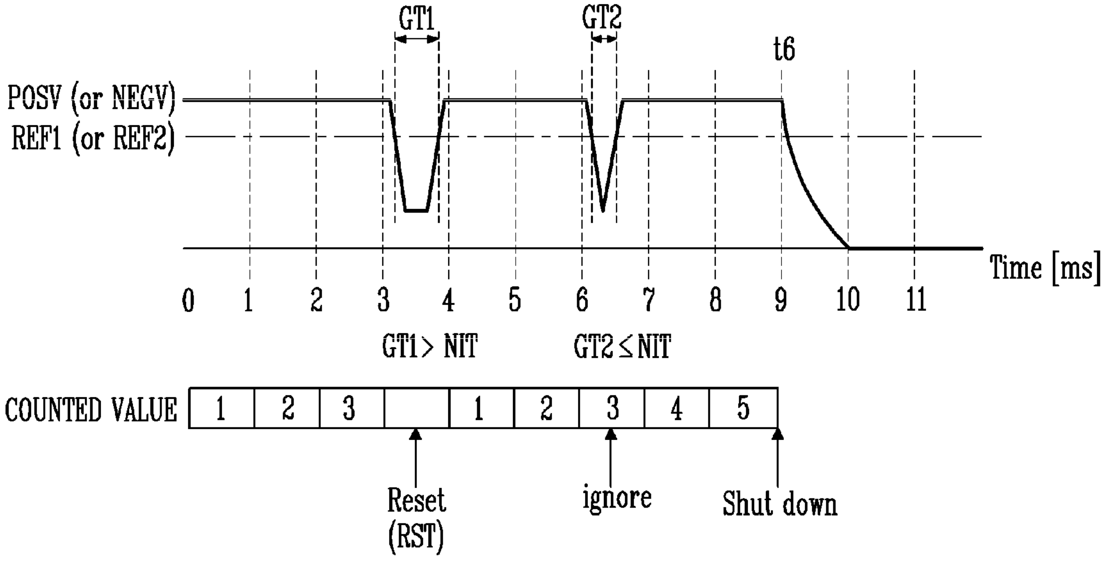
FIG. 13 is a hybrid graphical timing and conceptual diagram illustrating an example of an operation of the controller of FIG. 12.

FIG. 12 illustrates an example of the controller included in the power management driver of FIG. 6, and FIG. 13 illustrates an example of an operation of the controller of FIG. 12.

Referring to FIGS. 1, 6, 12, and 13, the controller 560 may include a counting counter 566 and a shutdown controller 568.

The shutdown controller 568 may count up the time during which a protection signal PTS is output. For example, the shutdown controller 568 may include a counter which counts up a period during which a gate-on level of the protection signal PTS is output.

When the counted value is greater than a preset shutdown reference time REFT, the shutdown controller 568 may output the protection signal PTS as a shutdown signal SDS. For example, counting-up may be performed at intervals of 1 ms, and the shutdown reference time REFT may be set to about 5 ms. Therefore, when the protection signal PTS having a gate-on level is output for a time of 5 ms, the shutdown signal SDS may be output, and driving for protecting the power management driver 500 or the display device 1000 from an overcurrent may be performed. In accordance with an embodiment, the shutdown signal SDS may shut down the operation of the power management driver 500 or the display device 1000.

The counting controller 566 may generate a reset signal RST for resetting the counted value based on a first glitch time that is the time during which a glitch in the first detected value POSV is detected. The reset signal RST may be provided to the shutdown controller 568.

Also, the counting controller 566 may generate the reset signal RST based on a second glitch time that is the time during which a glitch in the second detected value NEGV is detected.

The first glitch time may correspond to the time during which noise in the first detected value POSV is output. For example, as illustrated in FIG. 13, the glitch time may be defined as a period GT1 or GT2 during which the first detected value POSV decreases below the first reference value REF1. Similarly, the second glitch time during which noise in the second detected value NEGV is output may be defined as a period during which the second detected value NEGV decreases below the second reference value REF2.

During short detection, due to noise containing a glitch or the like, the sensitivity and accuracy of short detection may be deteriorated. The counting controller 566 may control the output of the reset signal RST based on the length of the time during which noise occurs. That is, the counting controller 566 may determine whether respective states of the first and second detected values POSV and NEGV are in an overcurrent state or in a temporary state attributable to noise or the like.

In an embodiment, when the first glitch time is greater than a preset noise ignorance time NIT (e.g., this relationship is indicated by GT1>NIT in FIG. 13), the counting controller 566 may generate the reset signal RST. For example, the noise ignorance time NIT may be set to about 0.5 ms. The shutdown controller 568 may reset the counted value in response to the reset signal RST.

In an embodiment, when the first glitch time is less than or equal to the noise ignorance time NIT (e.g., this relationship is indicated by GT1≤NIT in FIG. 13), the counting controller 566 does not generate a reset signal RST. That is, when the first glitch time is less than or equal to the noise ignorance time NIT, the corresponding glitch or noise may be ignored. Therefore, the shutdown controller 568 may maintain a count-up operation. When the counted value corresponds to the shutdown reference time REFT (e.g., this is indicated by t6 in FIG. 13), the shutdown signal SDS may be output.

Similarly, the counting controller 566 may determine whether to output the reset signal RS depending on the result of a comparison between the second glitch time and the noise ignorance time NIT.

In this way, the controller 560 may identify a glitch and noise in the first and second detected values POSV and NEGV detected during the sensing period, and may perform a protection function related to short detection (overcurrent detection), thus improving the reliability of short detection.

As described above, the power management driver 500 and the display device 1000 having the power management driver according to embodiments of the present disclosure may definitely separate a turn-off time point of the first switch SW1 and a turn-on time point of the second switch SW2 through a transition period between a display period and a sensing period. Therefore, heat generation and unnecessary power consumption that may occur when the first driving power having a first voltage V1 is supplied to the ground GND during the sensing period may be prevented or minimized.

Further, a protection function related to short detection and/or overcurrent detection may be performed in such a way that a masking period is inserted into the initial stage of the sensing period, and a glitch and noise in the detected values POSV and NEGV detected during the sensing period are identified or removed, thus improving the sensitivity and reliability of a function of detecting a short in a first power line PL1 and protecting the first power line PL1.

Embodiments of the present disclosure are not limited to the foregoing, and may be expanded in various forms without departing from the spirit and scope of the present disclosure. For example, the detectable faults are not limited to short-circuit faults, but may include other faults based on detectable changes in impedance such as, for example, short-circuit faults, reduced but non-zero impedance faults, increased but non-infinite impedance faults, and open-circuit faults. Moreover, the transition period may be after the display period and before the next sensing period, and/or after the sensing period and before the next display period, without limitation.

Although exemplary embodiments of the present disclosure have been described, those of ordinary skill in the pertinent art will appreciate that the present disclosure may be modified and changed in various forms without departing from the scope or spirit of the present disclosure as set forth in the accompanying claims and their equivalents.

What is claimed is:

1. A power management driver, comprising:

a first power supply configured to supply a first voltage to a first driving power terminal of a pixel through a power line during a sensing period, and supply a second voltage to the first driving power terminal of the pixel through the power line during a display period; and a fault detector configured to detect a current flowing through the power line to detect a fault in the power line during the sensing period, wherein the first power supply comprises:

a digital-to-analog converter configured to output the first voltage based on a voltage of an input power;

a first switch coupled between the digital-to-analog converter and the power line, the first switch turned on in response to a first enable signal; and a second switch coupled between the power line and a voltage source, to which the second voltage is supplied, the second switch turned on in response to a second enable signal.

2. The power management driver according to claim 1, further comprising:

a first delay component configured to generate the first enable signal by delaying a sensing control signal, and supply the first enable signal to the first switch during the sensing period; and a second delay component configured to generate the second enable signal by inverting and delaying the sensing control signal, and supply the second enable signal to the second switch during the display period.

3. The power management driver according to claim 2, wherein, when the sensing period progresses after the display period, the first enable signal makes a transition from a gate-off level to a gate-on level after the second enable signal has made a transition from a gate-on level to a gate-off level during a first transition period between the display period and the sensing period.

4. The power management driver according to claim 3, wherein, when the display period progresses after the sensing period, the second enable signal makes a transition from the gate-off level to the gate-on level after the first enable signal has made a transition from the gate-on level to the gate-off level during a second transition period between the sensing period and the display period.

5. The power management driver according to claim 1, wherein the second voltage is a ground voltage and the first voltage is higher than the second voltage.

6. The power management driver according to claim 1, further comprising:

a second power supply configured to supply a voltage of second driving power to the pixel during the sensing period and the display period.

7. The power management driver according to claim 1, wherein the fault detector comprises a short-circuit detecting circuit configured to detect the current flowing through the power line to detect a short in the power line during the sensing period.

8. The power management driver according to claim 7, wherein the short-circuit detecting circuit comprises:

a detected value extracting circuit configured to extract at least one of a first detected value and a second detected value based on a positive current or a negative current flowing through the output terminal during the sensing period; and a protector connected to the detected value extracting circuit to generate a protection signal based on the first detected value and the second detected value.

9. The power management driver according to claim 1 disposed in a display device, the display device further comprising:

pixels, including the pixel, coupled to the power line, scan lines, control lines, data lines, and sensing lines;

a scan driver configured to supply a scan signal to the scan lines and supply a control signal to the control lines;

a data driver configured to supply one of an image data signal and a sensing data signal to the data lines;

a sensing circuit configured to sense characteristics of driving transistors included in the pixels based on a sensing current supplied through the sensing lines during the sensing period, wherein the first voltage is supplied through the power line to the pixels during the sensing period, and the second voltage is supplied through the power line to the pixels during the display period.

10. A display device, comprising:

pixels coupled to scan lines, control lines, data lines, and sensing lines;

a scan driver configured to supply a scan signal to the scan lines and supply a control signal to the control lines;

a data driver configured to supply one of an image data signal and a sensing data signal to the data lines;

a sensing circuit configured to sense characteristics of driving transistors included in the pixels based on a sensing current supplied through the sensing lines during a sensing period; and a power management driver configured to provide first driving power and second driving power to the pixels, wherein the power management driver comprises:

a first power supply configured to supply a first voltage of the first driving power to a first driving power terminal of the pixels through a first power line during the sensing period, and supply a second voltage of the first driving power to the first driving power terminal of the pixels through the first power line during a display period;

a second power supply configured to supply a second voltage of the second driving power to the pixels through a second power line during the sensing period and the display period; and a fault detector configured to detect a reduced impedance fault in the first power line based on a current flowing through the first power line during the sensing period, and wherein the first power supply comprises:

a digital-to-analog converter configured to output the first voltage based on a voltage of an input power;

a first switch coupled between the digital-to-analog converter and the power line, the first switch turned on in response to a first enable signal; and a second switch coupled between the power line and a voltage source, to which the second voltage is supplied, the second switch turned on in response to a second enable signal.

11. The display device according to claim 10, wherein each of the pixels comprises:

a light-emitting element; and a driving transistor configured to control a current flowing from a source of the second driving power into the light-emitting element, and electrically coupled to the light-emitting element, wherein a source of the first driving power is coupled to an electrode of the light-emitting element.

12. A power management driver, comprising:

a first power supply configured to supply a first voltage to a first driving power terminal of a pixel through a power line during a sensing period, and supply a second voltage to the first driving power terminal of the pixel through the power line during a display period; and a fault detector comprising a detected value extraction circuit, and configured to detect a current flowing through the power line to detect a fault in the power line during the sensing period, wherein the first power supply comprises:

a digital-to-analog converter configured to output the first voltage based on a voltage of an input power;

a first switch coupled between the digital-to-analog converter and the power line, the first switch turned on in response to a first enable signal; and a second switch coupled between the power line and a voltage source, to which the second voltage is supplied, the second switch turned on in response to a second enable signal.

13. The power management driver according to claim 12, further comprising:

a first delay component configured to generate the first enable signal by delaying a sensing control signal, and supply the first enable signal to the first switch during the sensing period; and a second delay component configured to generate the second enable signal by inverting and delaying the sensing control signal, and supply the second enable signal to the second switch during the display period.

14. The power management driver according to claim 13, wherein, when the sensing period progresses after the display period, the first enable signal makes a transition from a gate-off level to a gate-on level after the second enable signal has made a transition from a gate-on level to a gate-off level during a first transition period between the display period and the sensing period.

15. The power management driver according to claim 14, wherein, when the display period progresses after the sensing period, the second enable signal makes a transition from the gate-off level to the gate-on level after the first enable signal has made a transition from the gate-on level to the gate-off level during a second transition period between the sensing period and the display period.

16. The power management driver according to claim 12, wherein the second voltage is a ground voltage and the first voltage is higher than the second voltage.

17. The power management driver according to claim 12, further comprising:

a second power supply configured to supply a voltage of second driving power to the pixel during the sensing period and the display period.

18. The power management driver according to claim 12, wherein the fault detector comprises a short-circuit detecting circuit configured to detect the current flowing through the power line to detect a short in the power line during the sensing period.

19. The power management driver according to claim 18, wherein the short-circuit detecting circuit comprises:

the detected value extraction circuit configured to extract at least one of a first detected value and a second detected value based on a positive current or a negative current flowing through the output terminal during the sensing period; and a protection circuit connected to the detected value extracting circuit to generate a protection signal based on the first detected value and the second detected value.

20. The power management driver according to claim 12 disposed in a display device, the display device further comprising:

pixels, including the pixel, coupled to the power line, scan lines, control lines, data lines, and sensing lines;

a scan driver configured to supply a scan signal to the scan lines and supply a control signal to the control lines;

a data driver configured to supply one of an image data signal and a sensing data signal to the data lines;

a sensing circuit configured to sense characteristics of driving transistors included in the pixels based on a sensing current supplied through the sensing lines during the sensing period, wherein the first voltage is supplied through the power line to the pixels during the sensing period, and the second voltage is supplied through the power line to the pixels during the display period.

* * * * *